(12) United States Patent
Xia et al.

(10) Patent No.: US 8,175,454 B2
(45) Date of Patent: May 8, 2012

(54) FAULT LOCATOR FOR LONG HAUL TRANSMISSION SYSTEM

(75) Inventors: Tiejun J Xia, Richardson, TX (US);
Glenn A Wellbrock, Wylie, TX (US);
George H Mohrmann, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 639 days.

(21) Appl. No.: 12/335,123

(22) Filed: Dec. 15, 2008

(65) Prior Publication Data

US 2010/0150547 A1    Jun. 17, 2010

(51) Int. Cl.
*H04B 10/08*    (2006.01)

(52) U.S. Cl. ................. 398/21; 398/17; 398/19

(58) Field of Classification Search .......... 398/13, 398/33, 79, 104, 151, 169, 173, 17, 19, 21
See application file for complete search history.

(56) References Cited

U.S. PATENT DOCUMENTS

| | | | |
|---|---|---|---|
| 6,301,036 B1 * | 10/2001 | Spencer | 398/31 |
| 2002/0131099 A1 | 9/2002 | Harasawa | |
| 2002/0131116 A1 | 9/2002 | Shimomura et al. | |
| 2004/0047295 A1 * | 3/2004 | Morreale | 370/241 |
| 2004/0047629 A1 * | 3/2004 | Evangelides et al. | 398/33 |
| 2004/0146305 A1 * | 7/2004 | Neubelt et al. | 398/173 |
| 2006/0159464 A1 * | 7/2006 | Cornwell et al. | 398/169 |
| 2006/0198016 A1 | 9/2006 | Akbaba et al. | |
| 2007/0041006 A1 * | 2/2007 | Abbott | 356/73.1 |
| 2008/0063405 A1 | 3/2008 | Wei et al. | |
| 2009/0027656 A1 * | 1/2009 | Zhang et al. | 356/73 |

* cited by examiner

*Primary Examiner* — Dzung Tran

(57) ABSTRACT

A system and methods include generating an optical time domain reflectrometry signal; transmitting the optical time domain reflectrometry signal on a first fiber path in a first direction through at least one optical amplifier; receiving a reflection of the optical time domain reflectrometry signal on the first fiber path in a second direction opposite the first direction; transmitting the reflected optical time domain reflectrometry signal on a second fiber path in the second direction, where the second fiber path is not the first fiber path; and determining a location of a fault on the first fiber path based on the reflected optical time domain reflectrometry signal.

20 Claims, 8 Drawing Sheets

FAULT LOCATOR FOR LONG HAUL TRANSMISSION SYSTEM

BACKGROUND

Fiber optic cables are used for high-speed communication and data transmission, often over long distances. At present, long haul fiber optic transmission networks may extend for distances as great as 4000 km, and greater distances are possible. In a fiber optic cable, an electrical signal from a communications signal source (e.g., telephone or data modem) is modulated onto a light wave and transported via a fiber optic connection to a receiver, where the electrical signal is recovered through a demodulation process. A critical factor in the implementation of fiber optic technology is the attenuation or signal loss characteristic of the fiber optic cable used as the transmission medium. Signals transmitted via a fiber optic channel attenuate over long distances, and at some distance from the signal source reach a sufficiently low level as to require amplification by a repeater inserted in the fiber channel. For reasons including the loss characteristics of fiber optic cable and other practical considerations, repeater stations on long haul fiber optic transmission lines may typically be located at spans of 80 km to 160 km apart.

For a large scale fiber network, optical fiber occasionally suffers interruptions or faults, for a variety of reasons. For example, fiber optic cables may be cut by accident; aging of fiber optic cables can result in reduced transmissivity, causing the optical signal to weaken; and kinks in fiber optic cable can diminish or interrupt optical signals. In order to repair a fault in a long haul transmission line, the fault must be located, and a field team sent to the fault location. Due to the large distances of the long haul fiber optic networks, a field repair the team may need to work for hours and days simply to locate the fault before they can repair the line. Instruments using optical time domain reflectrometry (OTDR) are effective in locating faults in fiber optic cable. However, due to the nature of long haul fiber systems, in which an amplifier will block any reflection, OTDR can only work for one span, while a long haul system may have as many as twenty spans. Furthermore, the loss of signal caused by a fault may trigger an automatic shutdown of the amplifiers closest to the fault, thereby preventing the transmission of signals, including OTDR signals, through the affected amplifiers. Thus, simply locating a fault in a long haul transmission network may require field teams to travel to multiple repeater locations, where each repeater location may be as far as 160 km from the next repeater station. Furthermore, faults in long haul fiber optic systems may be underground, and thus inaccessible to visual inspection. OTDR may be employed from repeater station amplifiers at both ends of the span containing the fault, in order to locate the fault more precisely than from a single OTDR, and thus to minimize the cost of locating, repairing and/or splicing the fault. However, such a technique necessarily requires more OTDR, at more locations.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may permit optical fiber network operators to locate a fault in a long haul network from a single remote location.

Figure 1:
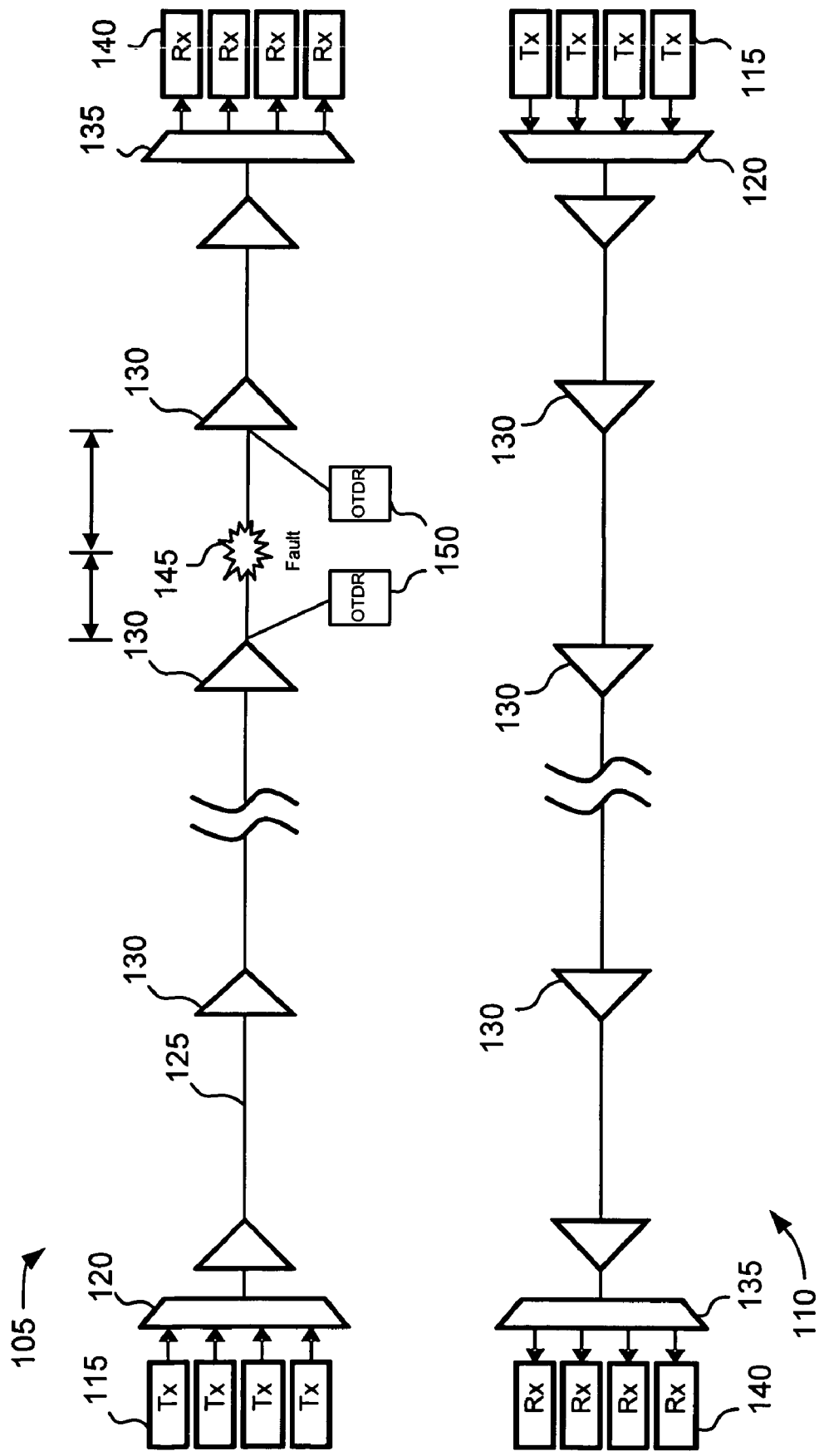
FIG. 1 is a diagram that illustrates an exemplary long haul fiber optic transmission network.

FIG. 1 is a diagram that illustrates an exemplary long haul fiber optic network 100. Exemplary long haul fiber optic network 100 may include long haul line 105 transmitting in a first direction, and a parallel long haul line 110 transmitting in the opposite direction of long haul line 105. While FIG. 1 shows a particular number and arrangement of components, long haul network 100, and long haul lines 105 and 110 may include additional, fewer, different, or differently arranged components than are illustrated in FIG. 1. The components and operation of long haul line 105 may be similar to the components and operation of long haul line 110, the only significant difference being the direction that signals are transmitted over the two lines. Exemplary long haul lines 105 and 110 may each include transmitters 115 and wave division multiplexer 120, located at a first terminal of long haul lines 105 and 110. Long haul lines 105 and 110 may also include a fiber optic cable 125 and multiple amplifiers 130 located between the first terminals of long haul lines 105 and 110, and second terminals of long haul lines 105 and 110, where wave division demultiplexer 135 and receivers 140 may be located.

As shown in FIG. 1, in one implementation, optical signals from a bank of transmitters 115 may be sent to wave division multiplexer 120, where multiple incoming signals may be multiplexed into a single outgoing signal for transmission over a fiber optic cable 125 in exemplary long haul line 105 or 110, operating in exemplary long haul fiber network 100. Exemplary long haul fiber optic network 100 may include multiple wave division multiplexers 120 for each long haul line.

Multiple amplifiers 130 may be spaced intermittently along exemplary long haul lines 105 and 110, to increase the signal strength sufficiently for travel along the full length of the long haul network 100. The distance between amplifiers 130 may be great, as much as 160 kilometers in exemplary long haul networks. As shown in FIG. 1, when a wave division-multiplexed signal has transited the full length of long haul line 105 or 110, the signal may be processed by wave division demultiplexer 135, where a single multiplexed incoming signal may be separated into multiple signals for delivery to receivers 140. In either exemplary long haul line 105 or 110, signal transmitters 115 and signal receivers 140 may be integrated in a single piece of hardware. Similarly, in either exemplary long haul line 105 or 110, wave division multiplexer 120 and wave division demultiplexer 140 may be integrated in a single piece of hardware. Further in exemplary fiber optic network 100, transmitters 115, wave division multiplexer 120, wave division demultiplexer 135, and receivers 140 may be located at a central location such as a Network Operation Center.

As shown in FIG. 1, a fault 145 may occur between two amplifiers 130 in long haul line 105, interrupting signal transmission in the line. In the exemplary fiber optic long haul network 100, optical time domain reflectrometry (OTDR) instruments 150 may be employed to locate the fault. OTDR may include transmitting a light pulse, or a series of light pulses, of a known wavelength at one point along exemplary long haul line 105 and then measuring, from the same point in exemplary long haul line 105, the fraction of light that is reflected back. The intensity of the reflected light is measured and integrated as a function of time, and is plotted as a function of fiber length. Thus, OTDR may be used for locating faults in a fiber optic line, as well as for estimating the fiber and connection losses. In exemplary fiber optic long haul network 100, amplifiers 130 block OTDR pulses and reflections. Furthermore, fault 145 may cause an automatic shutdown of long haul line 105. For example, fault 145 may cause sufficient loss of signal to trigger an automatic shutdown of amplifiers 130 that are located on either side of fault 145. Thus, in order to detect and locate fault 145, OTDR instruments 150 may be employed at amplifiers 130 at both ends of the span where fault 145 is located.

Figure 2:
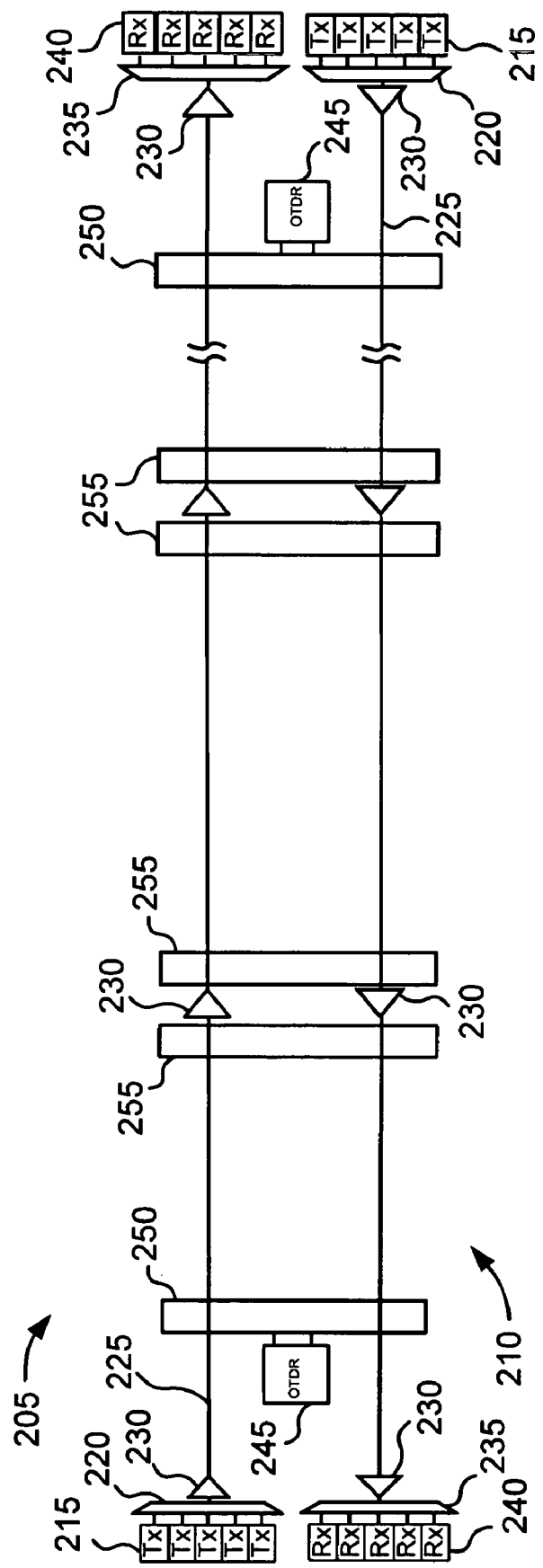
FIG. 2 is a diagram that illustrates an exemplary long haul fiber optic transmission network incorporating a system for remotely locating faults.

FIG. 2 is a diagram that illustrates an exemplary long haul fiber optic transmission network 200 incorporating a system for remotely locating faults. Exemplary long haul fiber optic network 200 may include a long haul line 205 for transmitting in a first direction, and a long haul line 210 transmitting in a second direction that is opposite to the first direction, a modified OTDR instrument 245 and an OTDR patch panel 250 installed at end terminal locations on long haul lines 205 and 210, and a set of automatic fiber patch panels 255 connected at particular intermediate locations on long haul lines 205 and 210.

Long haul line 205 may include a set of transmitters 215, a multiplexer 220, a fiber optic cable 225, a set of amplifiers 230, a demultiplexer 235, and a set of receivers 240. Long haul line 210 may also include a set of transmitters 215, a multiplexer 220, a fiber optic cable 225, a set of amplifiers 230, a demultiplexer 235, and a set of receivers 240.

Transmitter 215 may generally be regarded as an optical source, and may include any device that uses an electrical signal to modulate and generate an optical signal. In one implementation, transmitter 215 may include a laser, which may generate and transmit optical signals at a specific wavelength. For example, a bank of transmitters 215 may output multiple spatially-separated optical signals at different wavelengths, to wave division multiplexer 220.

Wave division multiplexer 220 may be any device that merges separate optical input signals into a single optical output signal. In one implementation, wave division multiplexer 220 may receive multiple spatially-separate optical signals from transmitters 215, and merge the separate signals to produce a combined outgoing signal for transmission on fiber optic cable 225.

Fiber optic cable 225 may be any medium for optical signal transmission. In one implementation, fiber optic cable 225 receives optical signals from wave division multiplexer 220 and transmits the signals to amplifier 230.

Amplifier 230 may include any device capable of increasing the strength, or amplitude, of an incoming optical signal, while maintaining the wavelength. In one implementation, multiple amplifiers 230 are spaced intermittently along exemplary long haul lines 205 and 210, to increase the signal strength sufficiently for travel along the full length of long haul lines 205 and 210.

Wave division demultiplexer 235 may be any device that receives an incoming optical signal comprising various wavelengths and spatially separates the component wavelengths, so that there is an outgoing signal at each component wavelength. In one implementation, demultiplexer 235 receives an optical signal from an amplifier 230, and delivers outgoing signals at component wavelengths to optical receivers 240.

Optical receivers 240 may include any device, including a charged coupled device and/or photodetector, that receives an incoming optical signal, and uses the incoming optical signal to modulate an outgoing electrical signal. In one implementation, optical receivers 240 receive incoming optical signals and use the optical signals to modulate electrical signals including video and telephonic transmissions.

Modified OTDR instrument 245 may include pulse and/or continuous light generation capability for conducting optical time domain reflectrometry on exemplary long haul lines 205 and 210. Modified instrument 245 may also include continuous optical signal generation capability, for preventing automatic laser shutdown of amplifiers 230. In this case, modified OTDR instrument 245 may also include wavelength coupling and signal splitting capabilities, for combining and separating the OTDR signals and the continuous optical signals, as detailed later with respect to FIG. 3.

OTDR patch panel 250 may include any device for receiving OTDR signals from an OTDR signal generator, and transmitting the OTDR signals to locate a fault in the fiber link span adjacent to OTDR patch panel 250. In one implementation, OTDR patch panel 250 may include an optical circulator to transmit OTDR signals from modified OTDR instrument 245 to a fault on line 205 or line 210, while transmitting reflected OTDR signals from a fault on line 205 or line 210, to modified OTDR instrument 245.

Automatic fiber patch panels 255 may include any device capable of receiving combined OTDR signals and a continuous optical signal from exemplary modified OTDR instruments 245, and transmitting the combined OTDR signals through exemplary amplifiers 230. In one implementation, automatic fiber patch panels include wavelength coupling and splitting capabilities as well as optical circulating capability, in a configuration that will be described later with respect to FIGS. 4 and 5.

While FIG. 2 shows a particular number and arrangement of components, long haul network 200, and long haul lines 205 and 210 may include additional, fewer, different, or differently arranged components than are illustrated in FIG. 2. The components and operation of exemplary long haul line 205 may be similar to the components and operation of exemplary long haul line 210, the only significant difference being the direction that signals are transmitted over the two lines. As shown in FIG. 2, long haul network 200 may include transmitters 215, wave division multiplexers 220, wave division demultiplexers 235, and optical receivers 240 located at end terminals of long haul lines 205 and 210. The term "terminal" may refer to any location with optical transmitters and/or receivers. In one implementation, a terminal may also include a wave division multiplexer and a wave division demultiplexer. In a further implementation, a terminal may be located where the operation of the entire network may be monitored and controlled. In this case, the terminals of long haul lines 205 and 210 may each be located at a network operations center.

In still other implementations, one or more components of exemplary long haul network 200 may perform one or more of the tasks described as being performed by one or more other components of exemplary long haul network 200. Also, one or more components of exemplary long haul network 200 may be located external to exemplary long haul network 200, or components may be distributed throughout the network described herein.

Figure 3:
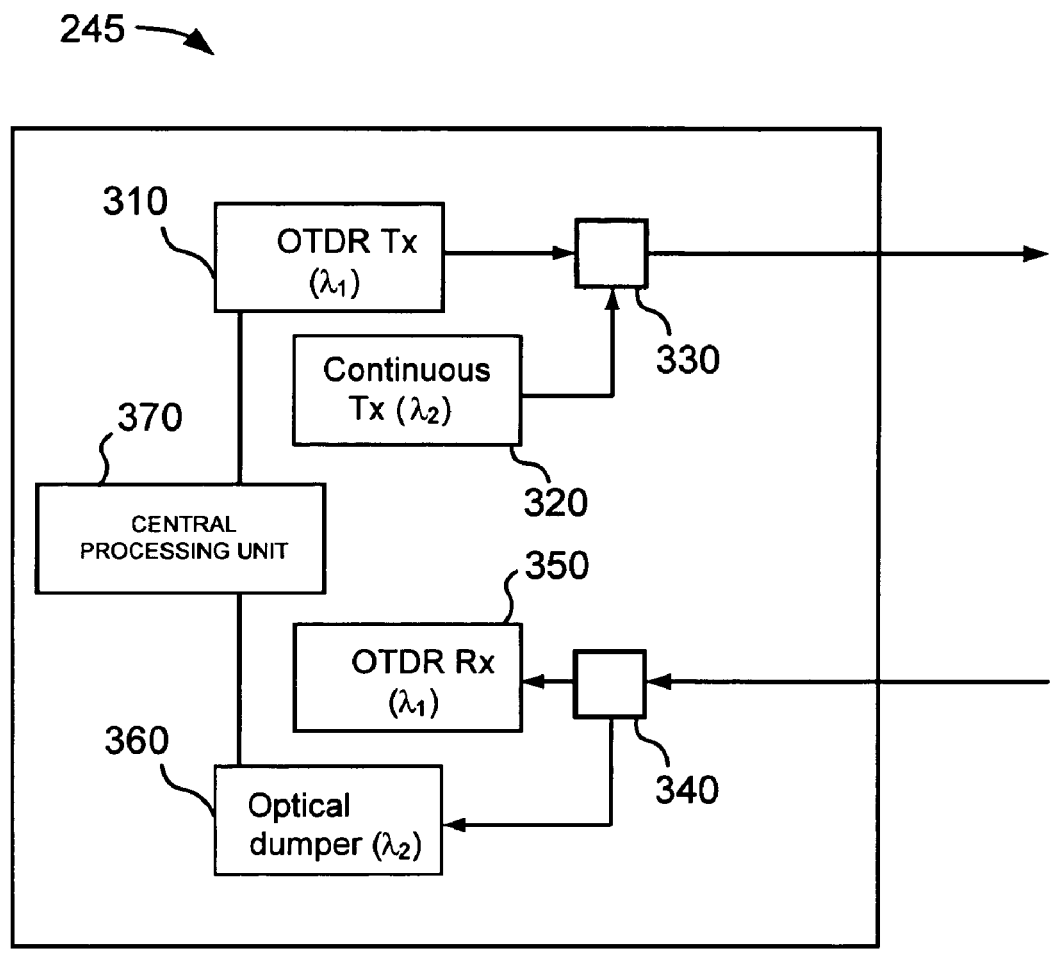
FIG. 3 is a diagram that illustrates an exemplary modified optical time domain reflectrometry instrument in the system described herein.

FIG. 3 is a diagram that illustrates the components of an exemplary modified optical time domain reflectometry instrument 245 in the system described herein. Exemplary modified OTDR instrument 245 may include an OTDR transmitter 310, a continuous optical signal generator 320, and wavelength coupler 330, a wavelength decoupler 340, OTDR receiver 350, optical dumper 360, and central processing unit 370. OTDR transmitter 310 may include any device for generating optical signals used in optical time domain reflectrometry. For example, OTDR transmitter 310 may include a device capable of sending an optical pulse, a series of optical pulses, or a continuous optical signal, at a known wavelength and signal strength, for measuring reflected signals in OTDR.

Continuous optical signal generator 320 may include any device capable of generating and transmitting a continuous optical signal, such as a laser. In one implementation, continuous optical signal generator 320 may be capable of generating a continuous optical signal of a wavelength and signal strength designed to prevent an automatic laser shutdown of one or more amplifiers 230.

Wavelength coupler 330 may include any device, including a multiplexer, capable of combining two or more optical signals, and outputting a single combined optical signal. In one implementation, wavelength coupler 330 may include a device that is capable of combining optical signals by wavelength.

Wavelength decoupler 340 may include any device, such as a splitter or demultiplexer, capable of receiving an incoming optical signal, and dividing the signal to produce two or more outgoing signals. In one implementation, wavelength decoupler may include a device that is capable of splitting combined optical signals by wavelength.

OTDR receiver 350 may include any device, including a photosensor and/or photodetector, that receives an incoming optical signal, and uses the incoming optical signal to modulate an outgoing electrical signal. In one implementation, OTDR receiver 350 receives reflected signals used in optical time domain reflectrometry, and uses the reflected signals for computing the distance to the source of the reflection.

Optical dumper 360 may include any optical element that receives and absorbs an incoming optical signal. In one implementation, optical dumper 360 may include a device designed to receive a laser signal while preventing reflection of the laser signal.

Central processing unit 370 may be any computing device capable of executing a computer program. In one implementation, central processing unit 370 may include a microprocessor including a stored program for computing distance based on a comparison of data from signals transmitted and received at a known wavelength.

In the operation of exemplary modified OTDR instrument 245, exemplary OTDR transmitter 310 may generate an optical pulse, series of optical pulses, and/or a continuous OTDR signal. Exemplary OTDR transmitter 310 may generate the OTDR signal at wavelength $\lambda_1$. For example, wavelength $\lambda_1$ may be a known wavelength for performing optical time domain reflectrometry.

Further in exemplary modified OTDR instrument 245, continuous optical signal generator 320 may generate a continuous optical signal. The continuous optical signal of continuous optical signal generator 320 may be at a wavelength $\lambda_2$, for example, one that is measurably distinct from wavelength $\lambda_1$. In one implementation of continuous optical signal generator 320, the continuous signal generated at wavelength $\lambda_2$ may be a laser transmission of a specific signal strength and wavelength, designed to prevent an automatic laser shutdown of exemplary amplifiers 230 and/or an automatic laser shutdown of exemplary long haul network 200. For example, a fault on any long haul line in long haul network 200 may trigger an automatic shutdown of the amplifiers that are located on either side of the fault.

Wavelength coupler 330 may receive, as inputs, the OTDR signal from exemplary OTDR transmitter 310 and the continuous optical signal from continuous optical signal generator 320. In one implementation, wavelength coupler 330 may combine the input signals to produce an output signal transmitting both wavelength $\lambda_1$ and wavelength $\lambda_2$. In this case, the output signal from wavelength coupler 330 may include an OTDR signal at wavelength $\lambda_1$, to be used for locating a fault in exemplary long haul network 200, and a continuous optical signal at wavelength $\lambda_2$, for preventing an automatic laser shutdown of exemplary long haul network 200. In one implementation, wavelength coupler 330 may transmit the combined signal to the nearest amplifier 230 on long haul link 205 and/or 210 (FIG. 2).

Wavelength decoupler 340 may receive an input signal comprising multiple wavelengths, and separate the input signal into multiple output signals at component wavelengths. In one implementation, the input signal may be received from the nearest amplifier on long haul link 205 and/or 210, and may include an OTDR signal at wavelength $\lambda_1$, and a continuous optical signal at wavelength $\lambda_2$. Wavelength decoupler 340 may separate the OTDR signal at wavelength $\lambda_1$ from the continuous optical signal at wavelength $\lambda_2$. Wavelength decoupler may direct the OTDR signal at wavelength $\lambda_1$ to optical receiver 350, and wavelength decoupler may direct the continuous optical signal at wavelength $\lambda_2$. to the optical dumper 360. The OTDR signal at wavelength $\lambda_1$ directed to exemplary OTDR receiver 350 may be a reflection of the OTDR signal at wavelength $\lambda_1$ generated by OTDR transmitter 310. The continuous optical signal at wavelength $\lambda_2$ signal directed to optical dumper 360 may be the continuous optical signal at wavelength $\lambda_2$ generated by continuous optical signal generator 320.

Central processing unit 370 may receive input signals from OTDR transmitter 310 and OTDR receiver 350. In one implementation, central processing unit may receive signal strength information from both OTDR transmitter 310 and OTDR receiver 350, which central processing unit 370 may use to produce an output of a computer program stored in central processing unit. For example, OTDR receiver 350 may receive a reflection of the OTDR signal at wavelength $\lambda_1$ generated by OTDR transmitter 310. In this case, central processing unit 370 may use the signal strength information from OTDR transmitter 310 and OTDR receiver 350 to determine a distance to the source of the reflection of the OTDR signal at wavelength $\lambda_1$.

Although FIG. 3 shows exemplary components of exemplary modified OTDR instrument 245, in other implementations, exemplary modified OTDR instrument 245 may contain fewer, additional, different, or differently arranged components than depicted in FIG. 3. In still other implementations, one or more components of exemplary modified OTDR instrument 245 may perform one or more of the tasks described as being performed by one or more other components of exemplary modified OTDR instrument 245. Also, one or more components of exemplary modified OTDR instrument 245 may be located external to exemplary modified OTDR instrument 245, or components may be distributed throughout the system described herein.

Figure 4:
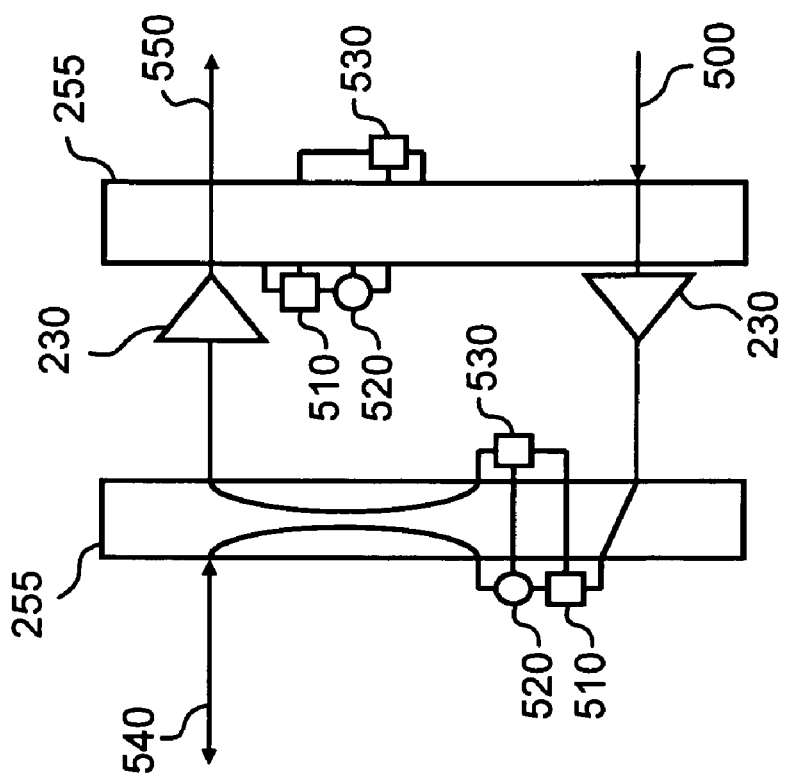
FIG. 4 is a diagram of an exemplary configuration of an exemplary automatic fiber patch panel that may be employed in the network of FIG. 2.

FIG. 4 is a diagram that illustrates the components of an exemplary automatic fiber patch panel 255. Exemplary automatic patch panel 255 may be located on both the input side and output side of amplifiers 230, and may include wavelength decoupler 410, optical circulator 420, and wavelength coupler 430. Wavelength decoupler 410 may include any device, such as a splitter or demultiplexer, capable of receiving an incoming optical signal, and dividing the signal to produce two or more outgoing signals. In one implementation, wavelength decoupler 410 may include a device that is capable of splitting combined optical signals by wavelength. For example, wavelength decoupler 410 may be switchable between splitting and non-splitting operation. In one implementation, a specific signal input may switch wavelength decoupler 410 to a signal splitting operation. In this case, an OTDR signal at wavelength $\lambda_1$ may automatically trigger a signal splitting operation of wavelength decoupler 410.

Optical circulator 420 may include any device capable of separating optical signals received from opposite directions in a single optical fiber. In one implementation, optical circulator 420 may receive a transmitted signal in one direction, and a reflection of the same signal in the opposite direction. For example, optical circulator 420 may receive an OTDR signal at wavelength λ1 in a first direction, and a reflected OTDR signal at wavelength λ1 in the opposite direction.

Wavelength coupler 430 may be any device capable of combining two or more optical signals, and outputting a single combined optical signal. In one implementation, wavelength coupler 430 may include a device that is capable of combining optical signals by wavelength, such as a multiplexer.

As shown in FIG. 4, exemplary automatic fiber patch panel 255 may be located on both the input side and output side of exemplary amplifiers 230. Functionally, automatic fiber patch panel 255 may operate in several modes. In a first, or idle mode, automatic fiber patch panel 255 may perform no signal processing at all. For example, assume that there are no faults in long haul network 200. In that case, optical signals may transit the full length of long haul lines 205 and 210 with no signal processing by automatic fiber patch panels 255 at any of the locations of repeater amplifiers 230. Further, an automatic fiber patch panel 255 may continue to operate in the first or idle mode whenever the amplifier 230 at the location of the automatic fiber patch panel 255 is not affected by a fault in an adjacent span of the long haul link. For example, assume a fault occurred between the first and second amplifiers 230 on long haul link 205. In that case, all of the automatic fiber patch panels on long haul link 205 that are not located at either the first or second amplifiers 230 may operate in idle mode, since only the first and second amplifiers 230 would be affected by the fault.

In one implementation, automatic fiber patch panel 255 may be switchable. For example, automatic fiber patch panel 255 may be switchable automatically. Assume that amplifier 230 is inactive due to an automatic laser shutdown, triggered by a fault on the fiber link span adjacent to amplifier 230. In this case, the automatic fiber patch panel 255 located at the affected amplifier 230 may be switched automatically from a first, or idle mode, to a second, or active mode, by the arrival of a signal including an OTDR signal at wavelength λ1, that has been transmitted by modified OTDR instrument 245 (FIGS. 2 and 3).

In addition to the first, or idle mode, automatic fiber patch panel 255 may operate in different configurations when active, depending on the directions of the multiple signals being processed. FIG. 4 is a diagram showing automatic fiber patch panel operating in an exemplary active mode, in the exemplary long haul network 200 described herein. Although the illustration of exemplary automatic fiber patch panel 255 in FIG. 4 may be described as active mode, such description is not intended to limit the function or application of exemplary automatic fiber patch panel 255. Rather, the description is intended solely to indicate that exemplary automatic fiber patch panel 255 may process optical signals in multiple directions.

In one implementation, an incoming signal to exemplary amplifier 230 may include a combined OTDR signal 400 from modified OTDR instrument 245 (FIGS. 2 and 3). For example, as described with respect to FIG. 3, a combined OTDR signal 400 may include an OTDR signal at wavelength $\lambda_1$, and a continuous optical signal at wavelength $\lambda_2$. In this case, amplifier 230 may transmit combined OTDR signal 400 to wavelength decoupler 410, which may separate the component signals of combined OTDR signal 400. In one implementation, wavelength decoupler 410 may deliver the OTDR signal at wavelength $\lambda_1$ to optical circulator 420. In this case, optical circulator 420 may transmit the OTDR signal at wavelength $\lambda_1$ as signal 440, to locate a fault in exemplary long haul network 200. Further in the operation of automatic fiber patch panel 255, wavelength decoupler 410 may deliver the continuous optical signal at wavelength $\lambda_2$ to wavelength coupler 430.

Assume that transmitted signal 440 comprises an OTDR signal at wavelength $\lambda_1$, and that signal 440 has encountered a fault. Now assume that the fault generates a reflected OTDR signal at wavelength $\lambda_1$, in the opposite direction of signal 440 transmitted from optical circulator 420. In this case, signal 440 may include both a transmitted OTDR signal at wavelength $\lambda_1$ in one direction, and a reflected OTDR signal at wavelength $\lambda_1$ in the opposite direction. Optical circulator 420 may receive the reflected OTDR signal at wavelength $\lambda_1$ and direct the reflected signal to wavelength coupler 430. Wavelength coupler 430 may combine the reflected OTDR signal at wavelength $\lambda_1$ with a continuous optical signal at wavelength $\lambda_2$, which wavelength coupler 430 may receive from wavelength decoupler 410. Wavelength coupler 430 may direct the combined OTDR signal, including reflected OTDR signal at wavelength $\lambda_1$ and continuous optical signal at wavelength $\lambda_2$, to amplifier 230 for transmission as outgoing optical signal 450. Amplifier 230 may direct outgoing signal 450 to modified OTDR instrument 245 (FIGS. 2 and 3).

Although FIG. 4 shows exemplary components of exemplary automatic fiber patch panel 255, in other implementations, exemplary automatic fiber patch panel 255 may contain fewer, additional, different, or differently arranged components than depicted in FIG. 4. In still other implementations, one or more components of exemplary automatic fiber patch panel 255 may perform one or more of the tasks described as being performed by one or more other components of exemplary automatic fiber patch panel 255. Also, one or more components of exemplary automatic fiber patch panel 255 may be located external to exemplary automatic fiber patch panel 255, or components may be distributed throughout the system described herein.

Figure 5:
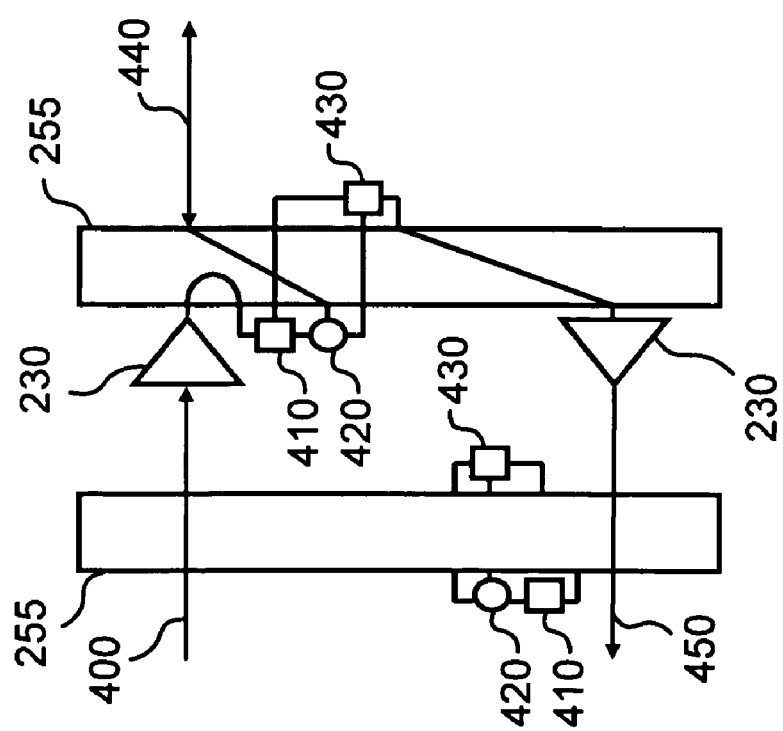
FIG. 5 is a diagram of an exemplary configuration of another exemplary automatic fiber patch panel that may be employed in the network of FIG. 2.

FIG. 5 is a diagram that illustrates the components of an exemplary automatic fiber patch panel 255, operating in an exemplary active mode, in the exemplary long haul network 200 described herein. Although the illustration of exemplary automatic fiber patch panel 255 in FIG. 5 may be described as active mode, such description is not intended to limit the function or application of exemplary automatic fiber patch panel 255. Rather, the description is intended solely to indicate that exemplary automatic fiber patch panel 255 may process optical signals in multiple directions.

As shown in FIG. 5, exemplary automatic fiber patch panel 255 may be located on both the input side and output side of exemplary amplifiers 230, and may include wavelength decoupler 510, optical circulator 520, and wavelength coupler 530. Wavelength decoupler 510 may include any device, such as a splitter or demultiplexer, capable of receiving an incoming optical signal, and dividing the signal to produce two or more outgoing signals. In one implementation, wavelength decoupler 510 may include a device that is capable of splitting combined optical signals by wavelength. For example, wavelength decoupler may be switchable between splitting and non-splitting operation. In one implementation, a specific input signal may switch wavelength decoupler 510 to a signal splitting operation. For example, an OTDR signal at wavelength $\lambda_1$ may automatically trigger a signal splitting operation of wavelength decoupler 510.

Optical circulator 520 may be any device capable of separating optical signals received from opposite directions in a single optical fiber. In one implementation, optical circulator 520 may receive a transmitted signal in one direction, and a reflection of the same signal in the opposite direction. For example, optical circulator 520 may receive an OTDR signal at wavelength λ1 in a first direction, and a reflected OTDR signal at wavelength λ1 in the opposite direction.

Wavelength coupler 530 may be any device capable of combining two or more optical signals, and outputting a single combined optical signal. In one implementation, wavelength coupler 530 may include a device that is capable of combining optical signals by wavelength, such as a demultiplexer.

In one implementation, an incoming signal to exemplary amplifier 230 may include a combined OTDR signal 500 from modified OTDR instrument 245 (FIGS. 2 and 3). For example, as described with respect to FIG. 3, a combined OTDR signal 500 may include an OTDR signal at wavelength $\lambda_1$, and a continuous optical signal at wavelength $\lambda_2$. In this case, amplifier 230 may transmit combined OTDR signal 500 to wavelength decoupler 510, which may separate the component signals of combined OTDR signal 500. In one implementation, wavelength decoupler 510 may deliver the OTDR signal at wavelength $\lambda_1$ to optical circulator 520. In this case, optical circulator 520 may transmit the OTDR signal at wavelength $\lambda_1$ as signal 540, to locate a fault in exemplary long haul network 200. Further in the operation of automatic fiber patch panel 255, wavelength decoupler 510 may deliver the continuous optical signal at wavelength $\lambda_2$ to wavelength coupler 530.

Assume that transmitted signal 540 comprises an OTDR signal at wavelength $\lambda_1$, and that signal 540 has encountered a fault. Now assume that the fault generates a reflected OTDR signal at wavelength $\lambda_1$, in the opposite direction of signal 540 transmitted from optical circulator 520. In this case, signal 540 may include both a transmitted OTDR signal at wavelength $\lambda_1$ in one direction, and a reflected OTDR signal at wavelength $\lambda_1$ in the opposite direction. Optical circulator 520 may receive the reflected OTDR signal at wavelength $\lambda_1$ and direct the reflected signal to wavelength coupler 530. Wavelength coupler 530 may combine the reflected OTDR signal at wavelength $\lambda_1$ with a continuous optical signal at wavelength $\lambda_2$, which wavelength coupler 530 may receive from wavelength decoupler 510. Wavelength coupler 530 may direct the combined OTDR signal, including reflected OTDR signal at wavelength $\lambda_1$ and continuous optical signal at wavelength $\lambda_2$, to amplifier 230 for transmission as outgoing optical signal 550. Amplifier 230 may direct outgoing signal 550 to modified OTDR instrument 245 (FIGS. 2 and 3).

Although FIG. 5 shows exemplary components of exemplary automatic fiber patch panel 255, in other implementations, exemplary automatic fiber patch panel 255 may contain fewer, additional, different, or differently arranged components than depicted in FIG. 5. In still other implementations, one or more components of exemplary automatic fiber patch panel 255 may perform one or more of the tasks described as being performed by one or more other components of exemplary automatic fiber patch panel 255. Also, one or more components of exemplary automatic fiber patch panel 255 may be located external to exemplary automatic fiber patch panel 255, or components may be distributed throughout the system described herein.

Figure 6:
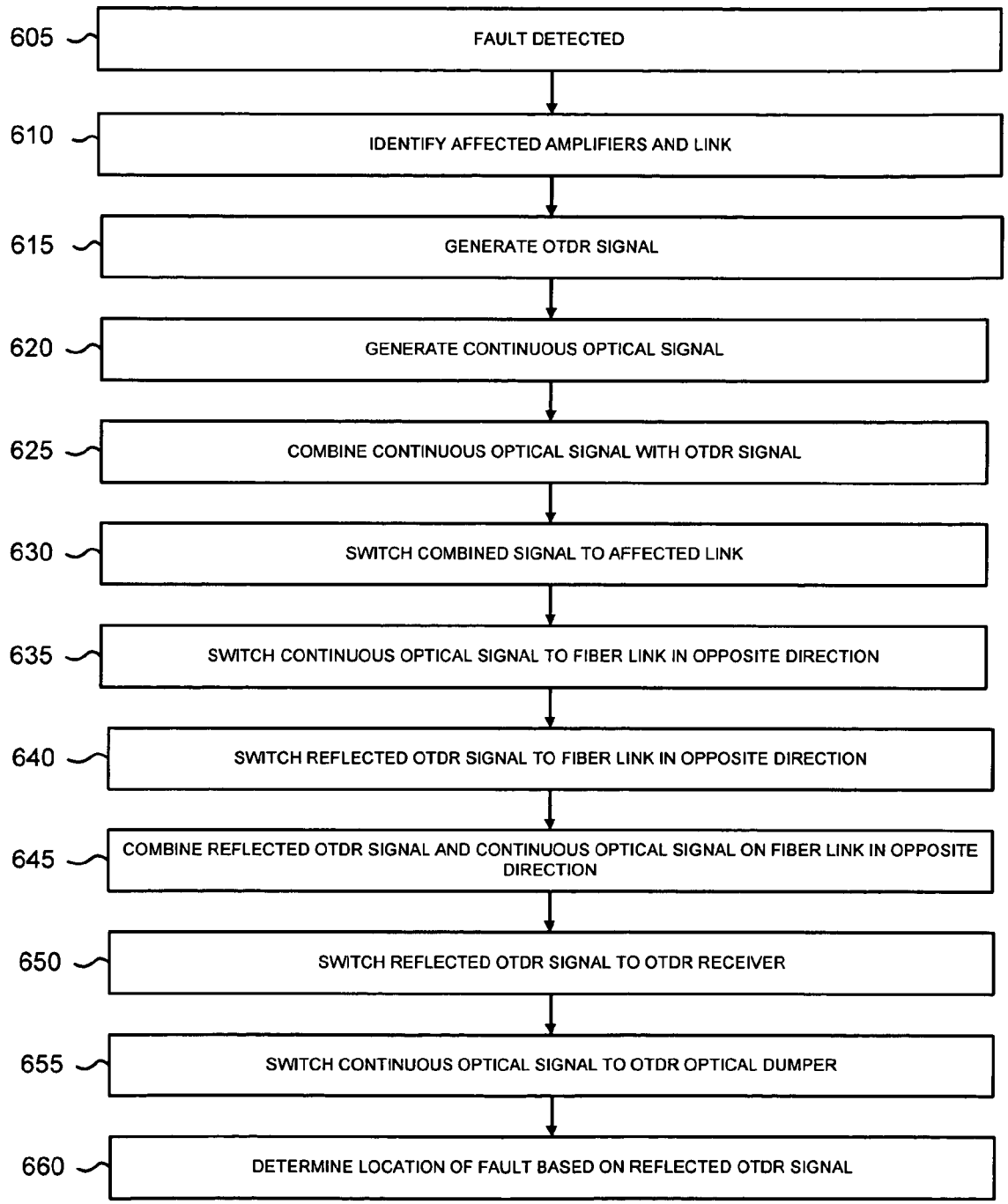
FIG. 6 is a flowchart of an exemplary process 600 for locating a fault in the exemplary long haul network of FIG. 2.

FIG. 6 is a flowchart of an exemplary process 600 for locating a fault in exemplary long haul fiber optic network 200. While the description to follow refers to an exemplary modified OTDR instrument 245, within exemplary long haul network 200, as performing operations included in exemplary process 600, this need not be the case. In one implementation, one or more of the blocks of process 600 may be performed by a combination of devices and or components of exemplary long haul network 200.

The process of FIG. 6 may begin with the detection of a fault in exemplary long haul network 200 (block 605). For example, assume that a fault has interrupted signal transmission. Assume further that the interruption has triggered an automatic laser shutdown of the amplifiers closest to the fault. For example, an automatic laser shutdown procedure may include a sequence where each amplifier with either no input signal or no output signal may be shut down automatically. Thus, in this case, the automatic laser shutdown permits the location affected amplifiers to be identified (block 610). Information regarding the location of the affected amplifiers may include the specific fiber line, or link, that includes the affected amplifiers. For example, a fault may be located on exemplary long haul line 205, as shown in FIG. 2.

An OTDR signal may be generated (block 615). In one implementation, the OTDR signal may be an optical pulse, series of optical pulses, and/or a continuous optical signal. For example, modified OTDR instrument 245 may generate an OTDR signal at wavelength $\lambda_1$, for locating a fault in exemplary long haul network 200.

A continuous optical signal may be generated to energize the amplifiers affected by automatic laser shutdown (block 620). In the case of an automatic laser shutdown, although it may be possible to transmit an OTDR through an affected (shut down) amplifier, the automatic shutdown sequence may interrupt the OTDR signal before sufficient data can be collected by the OTDR instrument to locate the fault. Thus, in one implementation, exemplary modified OTDR instrument 245 may generate a continuous optical signal at wavelength $\lambda_2$. For example, the continuous optical signal at wavelength $\lambda_2$ may be of a specific signal strength and wavelength to prevent an automatic laser shutdown of exemplary amplifiers 230 and/or an automatic laser shutdown of exemplary long haul network 200. In this case, the continuous optical signal at wavelength $\lambda_2$ may permit the OTDR signal generated in block 615 to transit all amplifiers located between the modified OTDR instrument 245 and a fault in long haul network 200.

After both the OTDR signal at wavelength $\lambda_1$ and the continuous optical signal at wavelength $\lambda_2$ have been generated, the continuous optical signal at wavelength $\lambda_2$ may be combined with the OTDR signal at wavelength $\lambda_1$ (block 625). In one implementation, as shown in FIG. 3, modified OTDR instrument 245 may direct the two signals to wavelength coupler 330, for transmission to the affected link. The exact sequence of blocks 615 and 620 may be of no significance, as long as the OTDR signal at wavelength $\lambda_1$ and the continuous optical signal at wavelength $\lambda_2$ are combined in block 625.

The combined signal may be switched to the affected fiber link (block 630). For example, a signal, including both the OTDR signal at wavelength $\lambda_1$ and the continuous optical signal at wavelength $\lambda_2$ generated by modified OTDR instrument 245, may be switched to long haul fiber line 205, in the exemplary long haul network 200 shown in FIG. 2. As shown in FIG. 2, exemplary long haul network 200 may include modified OTDR instrument 245 at either of two terminals in long haul network 200. Thus, in this case, modified OTDR instrument 245 may direct the combined signal to either of long haul line 205 or 210, as in examples that will be described later.

The continuous optical signal may be switched to a fiber link in the opposite direction of the affected link (block 635). In one implementation, as described with respect to FIGS. 4 and 5, exemplary automatic fiber patch panel 255 may switch the continuous optical signal at wavelength $\lambda_2$ to a fiber link in the opposite direction of the affected link. For example, once the combined signal has transited the amplifier affected by the automatic shutdown, the continuous optical signal may not be required beyond the affected amplifier. Thus, in this case, automatic fiber patch panel 255 may switch the continuous optical signal to a fiber link in the opposite direction.

When an OTDR signal encounters a fault in fiber optic network 200, the fault generates a reflected OTDR signal, in the opposite direction of the transmitted OTDR signal. The reflected OTDR signal from the location of the fault may be switched to the fiber link in the opposite direction (block 640). In one implementation, as described with respect to FIGS. 4 and 5, exemplary automatic fiber patch panel 255 may switch the reflected OTDR signal to a fiber link in the opposite direction. For example, a reflected OTDR signal from a fault in exemplary long haul fiber line 205 may be switched to long haul fiber line 210 in the opposite direction.

The reflected OTDR signal and the continuous optical signal may be combined on the fiber link in the opposite direction (block 645). In one implementation, as described with respect to FIGS. 4 and 5, exemplary automatic fiber patch panel 255 may combine the reflected OTDR signal and the continuous optical signal on a fiber link in the opposite direction. For example automatic fiber patch panel 255 may combine a reflected OTDR signal at wavelength $\lambda_1$ from a fault on exemplary long haul fiber line 205 with the continuous optical signal at wavelength $\lambda_2$, and transmit the combined signal on long haul fiber line 210 in the opposite direction of long haul line 205.

The reflected OTDR signal may be switched to an OTDR receiver (block 650). In one implementation, as shown with respect to FIG. 3, reflected OTDR signal may be switched by wavelength decoupler 340 to OTDR receiver 350, in modified OTDR instrument 245. For example, modified OTDR instrument 245 may receive a combined signal comprising a reflected OTDR signal at wavelength $\lambda_1$ and a continuous optical signal at wavelength $\lambda_2$, and wavelength decoupler 340 may direct the reflected OTDR signal at wavelength $\lambda_1$ to OTDR receiver 350.

The continuous optical signal may be switched to the optical dumper (block 655). In one implementation, as shown with respect to FIG. 3, the continuous optical signal may be switched by wavelength decoupler 340 to optical dumper 360 in modified OTDR instrument 245. For example, modified OTDR instrument 245 may receive a combined signal comprising a reflected OTDR signal at wavelength $\lambda_1$ and a continuous optical signal at wavelength $\lambda_2$, and wavelength decoupler 340 may direct the continuous optical signal at wavelength $\lambda_2$ to optical dumper 360.

The location of a fault may be determined based on the reflected OTDR signal. In one implementation, modified OTDR instrument 245 may measure the characteristics of a reflected OTDR signal, and compare those characteristics to a transmitted OTDR signal to determine distance to the fault that generated the reflection. For example, in modified OTDR instrument 245, OTDR receiver 350 and OTDR transmitter 310 may communicate information respectively related to reflected OTDR signal and transmitted OTDR signal. In this case, central processing unit 370 may compute the distance to the fault based on the information from OTDR receiver 350 and OTDR transmitter 310.

By repeating process 600 from the opposite end of the affected fiber link, the location of a fault may be located with a high degree of precision.

The foregoing description of blocks included in FIG. 6 provides illustration and description, but is not intended to be exhaustive or to limit the embodiments to the precise form disclosed. Modifications and variations are possible in light of the above teachings or may be acquired from practice of the invention. While a series of blocks has been described with regard to the flowchart of FIG. 6, the order of the blocks may differ in other implementations. For example, generation of an OTDR signal and the generation of a continuous optical signal (blocks 615 and 620) may be performed in any order, or they may be performed simultaneously. Similarly, the switching of a continuous optical signal and a reflected OTDR signal to a fiber link in the opposite direction (blocks 635 and 640) may be performed in any order, or they may be performed simultaneously.

Figure 7:
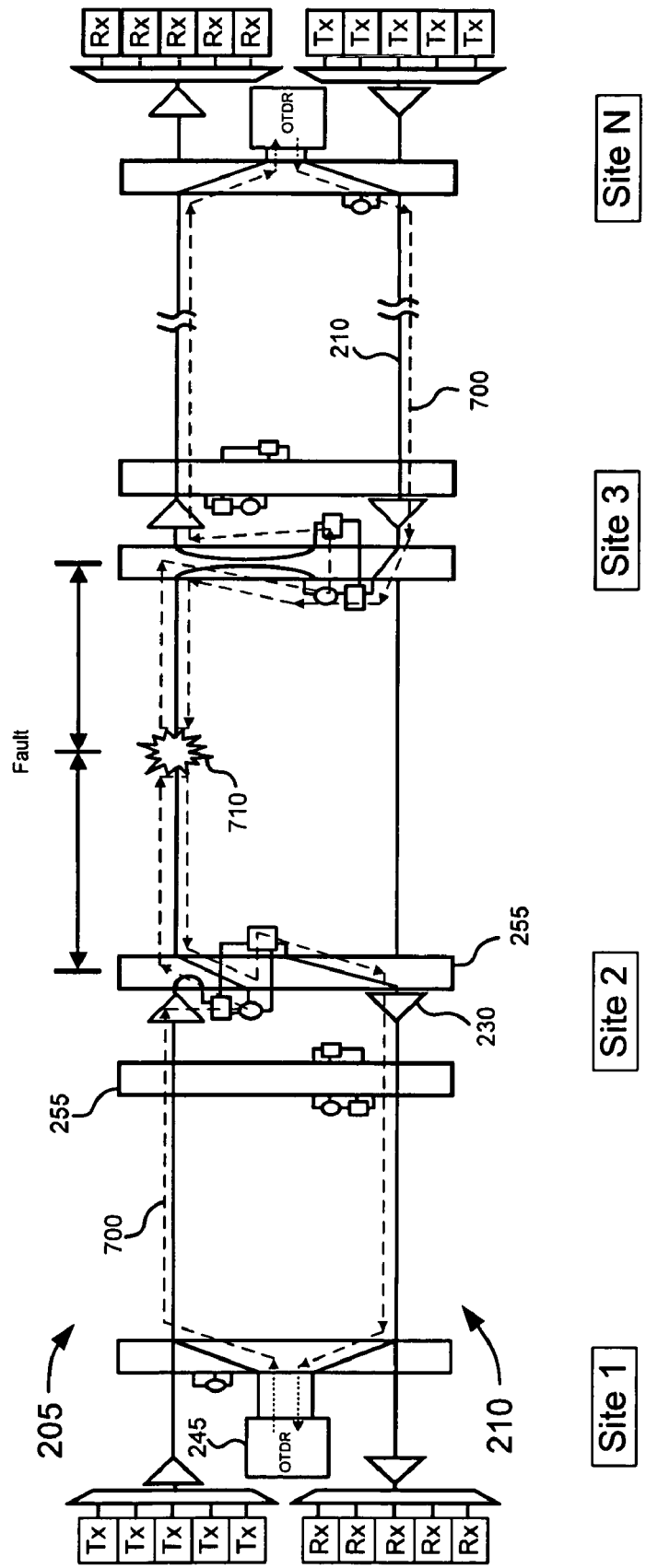
FIG. 7 is a diagram of an exemplary signal path in the exemplary long haul network of FIG. 2.

The process described with reference to FIG. 6 may be further demonstrated by examples. FIG. 7 is a diagram of a pair of exemplary signal paths in the exemplary long haul network 200 of FIG. 2. As shown in FIG. 7; modified OTDR instrument 245 may generate an exemplary OTDR signal 700 at wavelength $\lambda_1$, to be used for remotely locating a fault 710 in long haul network 200. Modified OTDR instrument 245 may be located at site 1. In one implementation, site 1 may be located at a terminal of a long haul fiber optic line. In this case, site 1 may be a network operations center as well as a terminal of exemplary long haul lines 205 and 210. Modified OTDR instrument 245 may generate OTDR signal 700 at wavelength $\lambda_1$ by in the manner described with respect to FIGS. 3 and 6.

As shown in FIG. 7, modified OTDR instrument 245 at site 1 may transmit OTDR signal 700 on long haul line 205, to amplifier 230 at site 2. Amplifier 230 at site 2 may have automatic fiber patch panels 255 located on both the input and output sides of exemplary amplifier 230. Automatic fiber patch panels 255 at site 2 may be configured as described with respect to FIGS. 4 and 5. In this case, automatic fiber patch panel 255 at site 2 may direct OTDR signal 700 to fault 710, on exemplary long haul line 205, as described with respect to FIGS. 4, 5, and 6.

As shown in FIG. 7, fault 710 on long haul line 205 generates a reflection of OTDR signal 700, and the reflected OTDR signal 700 may return to automatic fiber patch panel 255 at site 2. Automatic fiber patch panel 255 at site 2 may direct reflected OTDR signal 700 to exemplary long haul line 210, where reflected OTDR signal 700 may be received by modified OTDR instrument 245 at site 1, as described with respect to FIGS. 4, 5, and 6. Modified OTDR instrument 245 at site 1 may process reflected OTDR signal 700 as described with respect to FIGS. 3 and 6.

Further as shown in FIG. 7, modified OTDR instrument 245 at site N may generate a second OTDR signal 700, to be used for locating a fault 710 in exemplary long haul network 200. Modified OTDR instrument 245 at site N may generate OTDR signal 700 at wavelength $\lambda_1$ in the manner described with respect to FIGS. 3 and 6. Site N may be located at a terminal of exemplary long haul lines 205 and 210. In this case, site N may be a network operations center as well as a terminal of exemplary long haul lines 205 and 210.

As shown in FIG. 7, modified OTDR instrument 245 at site N may transmit OTDR signal 700 on long haul line 210 to amplifier 230 at site 3. Amplifier 230 at site 3 may have automatic fiber patch panels 255 located on both the input and output sides of amplifier 230. For example, exemplary automatic fiber patch panels 255 may be configured as described with respect to FIGS. 4 and 5. Further, in this case, automatic fiber patch panel 255 at site 3 may direct OTDR signal 700 from amplifier 230 at site 3 on long haul line 210 to fault 710, on fiber line 205, the affected fiber link, as described with respect to FIGS. 4, 5, and 6.

As shown in FIG. 7, fault 710 on long haul line 205 generates a reflection of OTDR signal 700, and the reflected OTDR signal 700 may return to automatic fiber patch panel 255 at site 3. Automatic fiber patch panel 255 at site 3 may direct reflected OTDR signal 700 to line 205 as described with respect to FIGS. 4, 5, and 6. In this case, automatic fiber patch panel 255 may direct OTDR signal 700 on long haul line 205 to modified OTDR instrument 245 at site N. Modified OTDR instrument 245 at site N may process reflected OTDR signal 700 as described with respect to FIGS. 3 and 6.

Also as shown in FIG. 7, exemplary OTDR signal 700 may transit several amplifiers 230 between site N and site 3, on long haul line 210. Each amplifier 230 located between site N and site 3 may have automatic fiber patch panels 255 located on both the input and output sides of exemplary amplifier 230. In this case, automatic fiber patch panels 255 at each amplifier 230 on long haul line 210 may operate in a first, or idle mode, as described with respect to FIGS. 4 and 5, thereby permitting exemplary OTDR signal 700 to transit each amplifier 230 located between site N and site 3.

Figure 8:
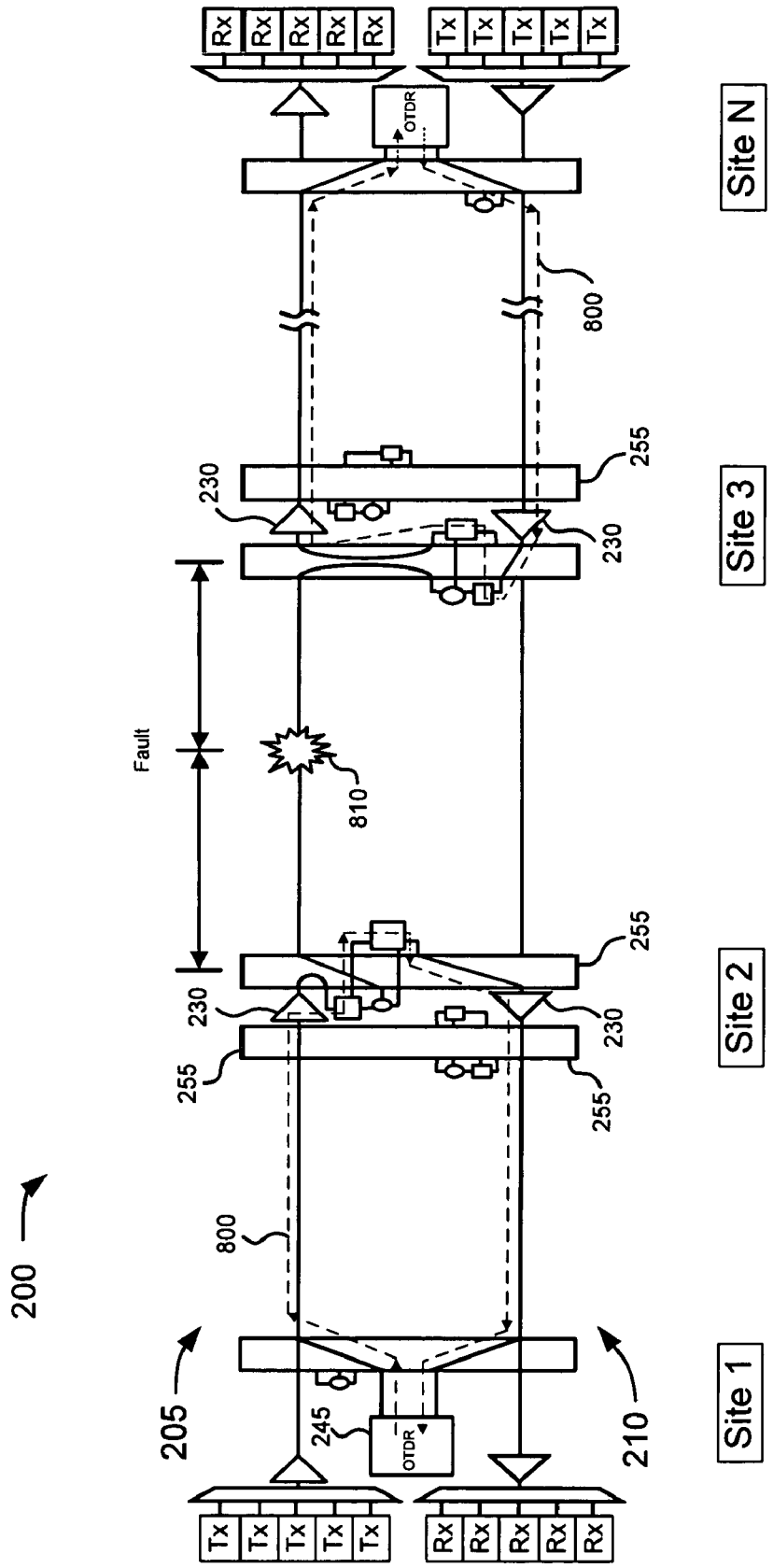
FIG. 8 is a diagram of an exemplary signal path in the exemplary long haul network of FIG. 2.

FIG. 8 is a diagram of another pair of exemplary signal paths in the exemplary long haul network of FIG. 2. As shown in FIG. 8, modified OTDR instrument 245 may generate an exemplary continuous optical signal 800, which may be used for preventing an automatic laser shutdown of amplifiers 230 closest to either side of a fault in exemplary long haul network 200. For example, modified OTDR instrument 245 may generate continuous optical signal 800 at a specific signal strength and wavelength designed to prevent an automatic laser shutdown of amplifiers 230. In one implementation, site 1 may be located at a terminal of exemplary long haul line 205. In this case, site 1 may be a network operations center as well as a terminal of exemplary long haul lines 205 and 210. Modified OTDR instrument 245 may generate continuous optical signal 800 at wavelength $\lambda_2$ in the manner described with respect to FIGS. 3 and 6.

As shown in FIG. 8, modified OTDR instrument 245 at site 1 may direct continuous optical signal 800 on exemplary long haul line 205 to exemplary amplifier 230 at site 2. Amplifier 230 at site 2 may have exemplary automatic fiber patch panels 255 located on both the input and output sides of exemplary amplifier 230. Automatic fiber patch panels 255 may be configured as described with respect to FIGS. 4 and 5. In one implementation, fault 810, on long haul line 205, may cause an automatic laser shutdown of amplifier 230 at site 2 on long haul line 205. In this case, transmission of continuous optical signal 800 at a known signal strength and at wavelength $\lambda_2$, where both signal characteristics are designed to prevent an automatic laser shutdown amplifier 230, may permit transmission of an OTDR signal used to locate fault 810.

Automatic fiber patch panel 255 at site 2 may direct continuous optical signal 800 from amplifier 230 on long haul line 205, to amplifier 230 on long haul line 210. Automatic fiber patch panel 255 at site 2 may process continuous optical signal 800 as described with respect to FIGS. 4, 5, and 6. As shown in FIG. 8, continuous optical signal 800 may transit long haul line 210, from amplifier 230 at site 2 to modified OTDR instrument 245 at site 1. Modified OTDR instrument 245 at site 1 may process continuous optical signal 800 as described with respect to FIGS. 3 and 6.

Further as shown in FIG. 8, modified OTDR instrument 245 may generate a second exemplary continuous optical signal 800 at site N, at a specific signal strength and wavelength designed to prevent an automatic laser shutdown of amplifiers 230 closest to either side of a fault in exemplary long haul network 200. Site N may be located at a terminal of exemplary long haul lines 205 and 210. In this case, site N may be a network operations center as well as a terminal of exemplary long haul lines 205 and 210. Modified OTDR instrument 245 at site N may generate continuous optical signal at wavelength $\lambda_2$ in the manner described with respect to in FIGS. 3 and 6.

As shown in FIG. 8, modified OTDR instrument 245 at site N may direct continuous optical signal 800 on long haul line 210 to amplifier 230 at site 3 on long haul line 210. Amplifier 230 at site 3 may have exemplary automatic fiber patch panels 255 located on both the input and output sides of amplifier 230. For example, exemplary automatic fiber patch panels 255 may be configured as described with respect to FIGS. 4 and 5. In one implementation, fault 810, on long haul line 205, may cause an automatic laser shutdown of amplifier 230 at site 3 on long haul line 205. In this case, transmission of continuous optical signal 800 at a known signal strength and at wavelength $\lambda_2$, where both signal characteristics are designed to prevent an automatic laser shutdown amplifier 230, may permit transmission of an OTDR signal used to locate fault 810. In this case, automatic fiber patch panel 255 at site 3 may direct continuous optical signal 800 from site 3 on long haul line 210 to amplifier 230 at site 3 on long haul line 205. Automatic fiber patch panel 255 at site 3 may process continuous optical signal 800 as described with respect to FIGS. 4, 5, and 6. As shown in FIG. 8, continuous optical signal 800 may transit long haul 205 from amplifier 230 at site 3 to modified OTDR instrument 245 at site N. Modified OTDR instrument 245 at site 1 may process continuous optical signal 800 as described with respect to FIGS. 3 and 6.

Also as shown in FIG. 8, continuous optical signal 800 may transit several amplifiers 230 between site N and site 3, on long haul line 210. In one implementation, each amplifier 230 located between site N and site 3 may have exemplary automatic fiber patch panels 255 located on both the input and output sides of exemplary amplifier 230. In this case, automatic fiber patch panels 255 at each amplifier 230 on long haul line 210 may operate in a first, or idle mode, as described with respect to FIGS. 4 and 5, thereby permitting to continuous optical signal 800 transit each amplifier 230 located between site N and site 3.

Figure 9:
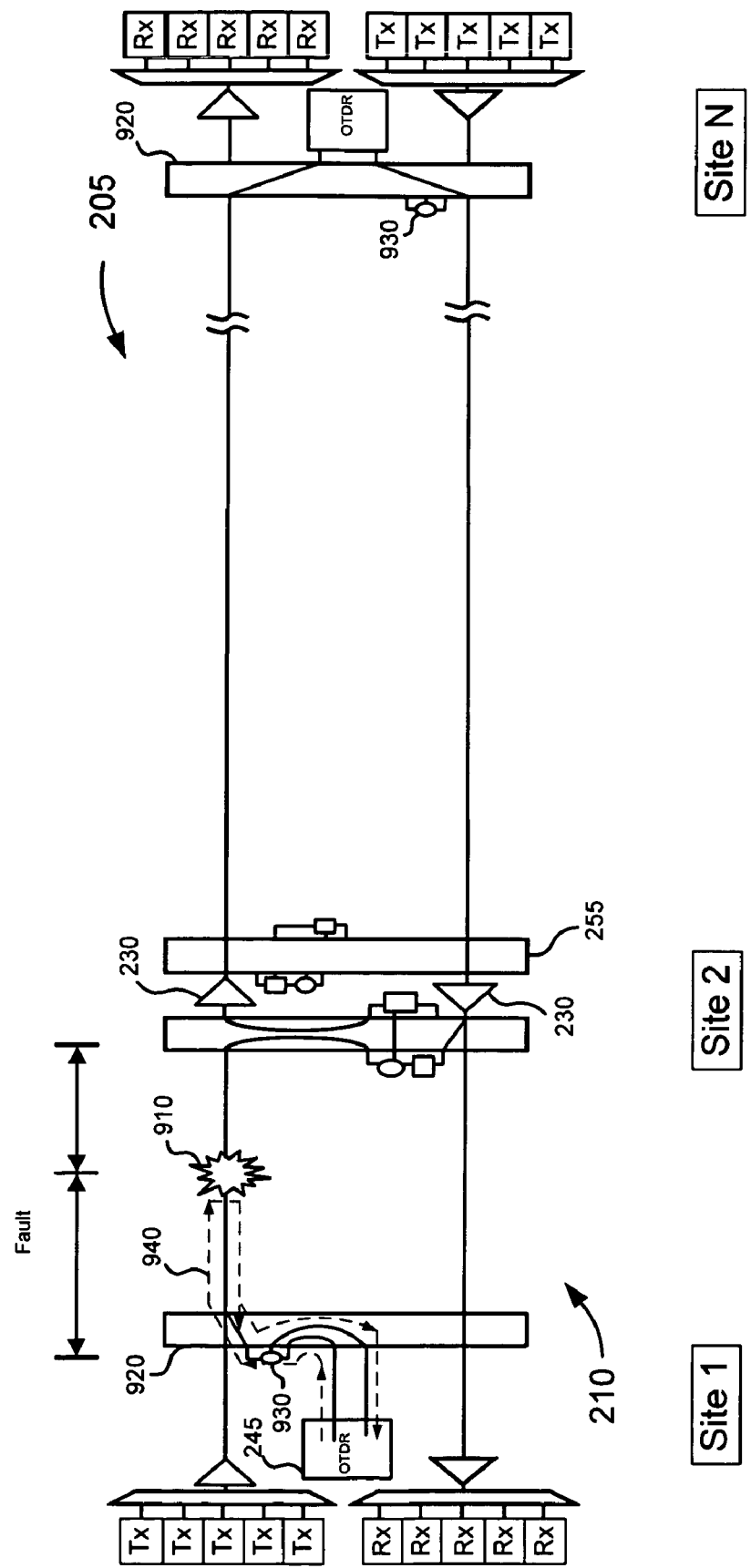
FIG. 9 is a diagram of an exemplary configuration of the exemplary long haul network of FIG. 2.

FIG. 9 is a diagram of an exemplary configuration of long haul network 200. As shown in FIG. 9, a fault 910 may be located in the first span of exemplary long haul line 205, the span closest to the terminal of exemplary long haul lines 205 and 210. In the example shown in FIG. 9, the location of modified OTDR instrument 245 relative to fault 910 may require modified OTDR instrument 245 at site 1 to conduct conventional OTDR operations. In this case, OTDR patch panel 920 may be installed at site 1. OTDR patch panel 920 may include optical circulator 930. Optical circulator 930 may include any device capable of separating optical signals received from opposite directions in a single optical fiber. In one implementation, optical circulator 930 may receive a transmitted signal in one direction, and a reflection of the same signal in the opposite direction. For example, optical circulator 930 may receive an OTDR signal at wavelength λ1 in a first direction, and a reflected OTDR signal at wavelength λ1 in the opposite direction.

As shown in FIG. 9, since there are no exemplary amplifiers 230 located in the signal path between exemplary modified OTDR instrument 245 and fault 910, there may be no need for a continuous signal generated at site 1 to prevent an automatic laser shutdown. In one implementation, modified OTDR instrument 245 may generate exemplary OTDR signal 940, as described with respect to FIG. 3. For example, modified OTDR instrument 245 may generate OTDR signal 940 at wavelength $\lambda_1$. In this case, wavelength $\lambda_1$ may be a known wavelength for performing optical time domain reflectrometry.

In one implementation, modified OTDR instrument 245 at site 1 may direct OTDR signal 940 to optical circulator 930 in OTDR patch panel 250, and along long haul line 205, to fault 910. As shown in FIG. 9, fault 910 generates a reflected OTDR signal 940, in the opposite direction of long haul line 205. Optical circulator 930 in OTDR patch panel 250 may receive the reflected OTDR signal 940, and transmit reflected OTDR signal 940 to modified OTDR instrument 245 at site 1. Modified OTDR instrument 245 at site 1 may process reflected OTDR signal 940 as described with respect to FIGS. 3 and 6. In the configuration of long haul network 200 shown in FIG. 9, OTDR operations from site N may be performed as described with respect to FIGS. 6 and 7.

The foregoing description provides illustration and description, but is not intended to be exhaustive or to limit the invention to the precise form disclosed. Modifications and variations are possible in light of the above teachings or may be acquired from practice of the invention.

For example, certain exemplary components have been presented with regard to automated fiber patch panels 250 in FIGS. 2, 4, 5, 6, and 7. These components are exemplary in nature and serve to facilitate the description of functions that can be performed by such components in connection with the fiber link fault locator system of the present invention. For example, any component identified as a circulator in FIGS. 2, 4, 5, 6, and 7 may be replaced by an appropriately configured power coupler.

Furthermore, while the embodiments disclosed have been presented as suitable for use in a long haul fiber network, the system and methods disclosed herein are suitable for any fiber line, or link, that includes multiple amplifier spans, or hops.

Certain terms, like "fiber line" and "fiber link" have been referred to above. It should be understood that these terms are intended to be interchangeable. Also, terms referring to amplifiers (or amplifier stations) and repeaters (or repeater stations) are equivalent, and refer to the same concept. Similarly, terms referring to laser and a continuous optical signal are equivalent, and refer to the same concept. The terms "decoupler" and "splitter" are also equivalent, and refer to the same concept.

The foregoing description provides illustration and description, but is not intended to be exhaustive or to limit the invention to the precise form disclosed. Modifications and variations are possible in light of the above teachings or may be acquired from practice of the invention.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
   a first device to:
      generate a first optical signal at a first wavelength,
      generate a second optical signal at a second wavelength,
      combine the first optical signal and the second optical signal to form a first combined signal, and
      transmit the first combined signal on a first fiber optic link in a first direction; and
   a second device to:
      receive, from the first device, the first combined signal,
      extract, from the first combined signal, the first optical signal at the first wavelength and the second optical signal at the second wavelength,
      transmit the extracted first optical signal toward a target,
      receive a reflection of the transmitted first optical signal, from the target, as a reflected first optical signal,
      combine the reflected first optical signal and the extracted second optical signal to form a second combined signal, and
      transmit the second combined signal to the first device, on a second fiber optic link in a second direction opposite the first direction,
   where the first device is further to:
      receive, from the second device, the second combined signal; and
      split the second combined signal to separate the reflected first optical signal at the first wavelength and the second optical signal at the second wavelength,
   where the first device and the second device operate in a fiber optic network that includes multiple optical amplifiers along the first fiber optic link and the second fiber optic link, and
   where the second optical signal prevents automatic laser shutdown of at least one of the multiple optical amplifiers.

2. The system of claim 1, where the target is a fault in a fiber optic link in the fiber optic network.

3. The system of claim 2, where first device is further to determine a location of the fault based on the reflected first optical signal.

4. The system of claim 1, where the second device includes an optical circulator for transmitting the first optical signal and the reflected first optical signal.

5. The system of claim 1, where the second device includes a power coupler for transmitting the first optical signal and the reflected first optical signal.

6. The system of claim 1, where the second device includes a wavelength coupler and a wavelength decoupler for combining and splitting at least one of:
the first optical signal and the second optical signal; or
the reflected first optical signal and the second optical signal.

7. A method comprising:
generating an optical signal;
transmitting the optical signal on a first fiber path in a first direction through at least one optical amplifier;
receiving a reflection of the optical signal on the first fiber path in a second direction opposite the first direction;
transmitting the reflected optical signal on a second fiber path in the second direction, where the second fiber path differs from the first fiber path;
transmitting a second optical signal, where the second optical signal is transmitted on either:
the first fiber path in the first direction through the at least one optical amplifier, or
the second fiber path in the second direction through the at least one optical amplifier,
where the second optical signal prevents an automatic laser shutdown of the at least one optical amplifier; and
determining a location of a fault on the first fiber path based on the reflected optical signal.

8. A method comprising:
generating an optical signal;
transmitting the optical signal on a first fiber path in a first direction through at least one optical amplifier;
receiving a reflection of the optical signal on the first fiber path in a second direction opposite the first direction;
transmitting the reflected optical signal on a second fiber path in the second direction, where the second fiber path differs from the first fiber path;
generating a second optical signal;
transmitting the second optical signal on the second fiber path in the second direction through the at least one other optical amplifier;
switching the second optical signal to the first fiber path in the second direction;
receiving a reflection of the second optical signal on the first fiber path in the first direction;
transmitting the reflected second optical signal on the first fiber path in the first direction; and
determining a location of a fault on the first fiber path based on the reflected optical signal and the reflected second optical signal.

9. The method of claim 8, where the reflected first optical signal is transmitted one the second fiber path by an optical circulator.

10. The method of claim 8, where the reflected first optical signal is transmitted on the second fiber path by a power coupler.

11. The method of claim 8, further comprising:
combining at least one of the first optical signal and the second optical signal, or the reflected first optical signal and the reflected second optical signal, to form a combined signal;
amplifying the combined signal; and
splitting the amplified combined signal to form at least one of:
an amplified first optical signal and an amplified second optical signal, or
an amplified reflected first optical signal and an amplified reflected second optical signal.

12. A system comprising:
a fiber network including a first fiber path and a second fiber path, where the first fiber path includes at least one first amplifier, and where the second-fiber path includes at least one second amplifier;
means for generating an optical signal;
means for transmitting the optical signal on the first fiber path in a first direction through the at least one first amplifier;
means for receiving, from the first fiber path in a second direction opposite the first direction, a reflection of the optical signal through the at least one second amplifier;
means for transmitting the reflection of the optical signal along the second fiber path in the second direction;
means for generating a second optical signal;
means for transmitting the second signal on the second fiber path in the second direction through the at least one second amplifier,
where the second optical signal prevents an automatic laser shutdown of the at least one first amplifier or the at least one second amplifier; and
means for determining a location of a fault on the first fiber path based on the reflected optical signal.

13. The system of claim 12, further comprising:
means for switching the second optical signal from the first fiber path in the first direction to the second fiber path in the second direction.

14. The system of claim 12, where the means for generating the second optical signal includes a laser.

15. The system of claim 12, where the means for transmitting the reflection of the optical signal include at least one of:
an optical circulator, or
a power coupler.

16. The system of claim 12, further comprising:
means for forming a combined signal by combining at least one of:
the first optical signal and the second optical signal; or
the reflection of first optical signal and the second optical signal; and
means for receiving the combined signal and splitting the combined signal to obtain at least one of:
the first optical signal and the second optical signal, or
the reflection of first optical signal and the second optical signal.

17. A system comprising:
means for generating an optical signal associated with a fiber network that includes a first fiber path and a second fiber path, where the first fiber path includes at least one first amplifier, and where the second-fiber path includes at least one second amplifier;
means for transmitting the optical signal on the first fiber path in a first direction through the at least one first amplifier;
means for receiving, from the first fiber path in a second direction opposite the first direction, a reflection of the optical signal through the at least one second amplifier;
means for transmitting the reflection of the optical signal along the second fiber path in the second direction;
means for generating a second optical signal;
means for transmitting the second optical signal on the second fiber path in the second direction;
means for switching the second optical signal from the second fiber path, in the second direction, to the first fiber path in the second direction;
means for transmitting a reflection of the second optical signal on the first fiber path in the first direction; and means for determining the location of a fault on the first fiber path based on the reflected optical signal and the reflected second optical domain reflectometry signal.

18. The system of claim 17, further comprising:
means for switching the second optical signal from the first fiber path in the first direction to the second fiber path in the second direction.

19. The system of claim 17, where:
the means for generating the first optical signal includes a first laser,
the means for generating the second optical signal includes a second laser, and
where the first laser and the second laser generate the first optical signal and the second optical signals at respective different wavelengths.

20. The system of claim 17, where the means for transmitting the reflection of the optical signal includes at least one of:
an optical circulator, or
a power coupler.

* * * * *